United States Patent [19]

Tsubuko et al.

[11] Patent Number: 4,764,447
[45] Date of Patent: Aug. 16, 1988

[54] NON-AQUEOUS TYPE RESIN DISPERSION AND ELECTROPHOTOGRAPHIC DEVELOPER CONTAINING SAID RESIN

[75] Inventors: Kazuo Tsubuko; Shinichi Kuramoto; Kayoko Nagai, all of Numazu; Makoto Okawara, Tokyo; Hajime Takanashi, Numazu, all of Japan

[73] Assignee: Ricoh Co., Ltd., Tokyo, Japan

[21] Appl. No.: 883,182

[22] Filed: Jul. 8, 1986

[30] Foreign Application Priority Data

Jul. 17, 1985 [JP] Japan .................... 60-157912
Jul. 17, 1985 [JP] Japan .................... 60-157913

[51] Int. Cl.$^4$ .................. G03G 9/12; C08L 35/02
[52] U.S. Cl. .................... 430/115; 430/114; 524/853
[58] Field of Search ............... 430/114, 115; 524/853

[56] References Cited

U.S. PATENT DOCUMENTS

| | | | |
|---|---|---|---|
| 3,317,491 | 5/1967 | Kanavel . | |
| 3,585,140 | 6/1971 | Machida et al. | 430/115 |
| 3,976,611 | 8/1976 | Aloia | 526/5 |
| 4,173,559 | 11/1979 | Beck | 428/463 |
| 4,388,395 | 6/1983 | Tsubuko et al. | 430/115 X |

FOREIGN PATENT DOCUMENTS

| | | | |
|---|---|---|---|
| 58-104974 | 6/1983 | Japan | 524/853 |
| 59-114550 | 7/1984 | Japan | 430/114 |
| 60-185962 | 9/1985 | Japan | 430/114 |
| 60-248712 | 12/1985 | Japan | 524/853 |
| 943217 | 12/1963 | United Kingdom . | |
| 1440282 | 6/1976 | United Kingdom . | |
| 1589975 | 5/1981 | United Kingdom . | |
| 2140434 | 11/1984 | United Kingdom . | |

OTHER PUBLICATIONS

Central Patents Index, 1983, reference 02707K/02 and 00610K/01.
Patent Abstract of Japan; C-55, Aug. 11, 1979, vol. 3, No. 95, 54–73839.

Primary Examiner—Roland E. Martin
Attorney, Agent, or Firm—Flynn, Thiel, Boutell & Tanis

[57] ABSTRACT

This invention relates to a non-aqueous type resin dispersion obtained by polymerizing a polymerizable composition containing at least monomer A represented by the general formula (I),

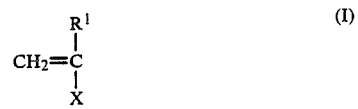

(wherein, $R^1$ represents —H or —CH$_3$, X represents —COOC$_n$H$_{2n+1}$ or —OCOC$_n$H$_{2n+1}$, and n represents an integer of 6–20), monomer B represented by the general formula (II),

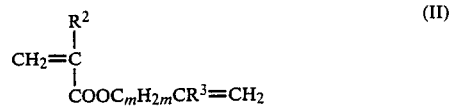

(wherein, $R^2$ and $R^3$ represent —H or —CH$_3$ and m represents an integer of 1–20), and monomer C having a carboxyl group or a glycidyl group in the presence of a polymerization initiator in an aliphatic hydrocarbon solvent.

14 Claims, No Drawings

NON-AQUEOUS TYPE RESIN DISPERSION AND ELECTROPHOTOGRAPHIC DEVELOPER CONTAINING SAID RESIN

BACKGROUND OF THE INVENTION (a) Field of the Invention

The present invention relates to a non-aqueous type resin dispersion useful for a liquid developer for electrostatic photography, paints, printing inks, adhesives and the like.

(b) Description of the Prior Art

The resin dispersions used for a liquid developer for electrostatic photography, paints, inks and the like have normally been prepared by dispersing separately prepared resins such as alkylphenol, rosin-modified phenol resin, rosin-modified alkyd resin, maleic resin and the like in a solvent comprising a petroleum aliphatic hydrocarbon or its halide in the case of a developer, and in an aromatic hydrocarbon solvent in the case of a paint or ink.

The resin dispersion of this sort is demanded to have the following properties (1) the viscosity and fluidity are proper, (2) the dispersion stability and preservability to pigments are superior, (3) the coated film is lustrous and superior in adhesive strength, (4) the coated film dries quickly, and the like. However, conventional resin dispersions could not satisfy these requirements completely. Improvement in the performance of resin dispersions has been long-awaited.

In particular, the toner in the usual liquid developer for electrostatic photography includes a problem that although said toner normally functions to cause electrophoresis in response to the electric charge of an electrostatic latent image formed on the surface layer of an electrophotographic sensitive material or electrostatic recording material and form an image attached to that portion in a developing step, its resin and polarity control agent diffuse in a carrier liquid with the lapse of time to cause aggregation and make the polarity indistinct to thereby markedly deteriorate the image quality, in particular image density in the usual liquid developer, and other problems that since the adhesive strength of the toner (namely, the fixing strength of the image) is weak, the reslting image can be erased with an eraser, that when it is used for a color electrophotography, 4 colors such as yellow, red, blue and black can not overlap uniformly due to lack of transparency of the toner, thereby making the faithful color regeneration impossible, that when an image is formed on a zinc oxide sensitive paper and offset printing is effected by the use of same as an offset master, the number of durably printed sheets is not many and printing is not stable, and the like.

SUMMARY OF THE INVENTION

The present invention aims at provision of a resin free from the above mentioned conventional faults, which is excellent in the dispersibility of pigments and the like and also excellent in the electric charge control and fixativity when used as electrophotographic toner, paint and printing ink, or a dispersion containing said resin.

In particular, the present invention aims at provision of a liquid developer for electrostatic photography improved in the preservation stability and adhesive strength of the toner, which is superior in gradient, can form a high quality image, is difficult to be erased with an eraser, and can solve the problem of color regeneration in color electron photography and the problems of printing durability and unstable printing.

That is, one object of the present invention is to provide a non-aqueous type resin dispersion obtained by polymerizing a system containing at least monomer A represented by the general formula (I),

(wherein, $R^1$ represents —H or —$CH_3$, X represents —$COOC_nH_{2n+1}$ or —$OCOC_nH_{2n+1}$, and n represents an integer of 6–20), monomer B represented by the general formula (II),

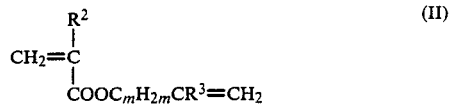

(wherein, $R^2$ and $R^3$ represent —H or —$CH_3$ and m represents an integer of 1–20), and monomer C having a carboxyl group or a glycidyl group in the presence of a polymerization initiator in an aliphatic hydrocarbon solvent.

Another object of the present invention is to provide a liquid developer for electrostatic photography characterized by containing said non-aqueous type resin.

The inventors of this application have variously investigated what properties the resin (polymer) used for achieving the aforesaid objects should have, and come to the following conclusion. The properties this polymer should possess are enumerated as follows, that is (1) a solvation component is present in the polymer and this polymer has a uniform graft point, (2) this polymer contains a crosslinking monomer component that does not cause a too rapid crosslinking reaction, (3) this polymer contains a monomer component that causes a copolymerization reaction and a crosslinking reaction separately, (4) this polymer has an affinity for pigments, (5) this polymer does not dissolve in a non-aqueous solvent but merely disperses in said non-aqueous solvent, (6) this polymer is structured to introduce a polar group for dispersing pigments, (7) this polymer introduces a polar group for raising its adhesive strength, and the like. The inventors of this application have further examined and investigated various polymers from these viewpoints to find that a polymer obtained by copolymerizing monomer A represented by said general formula (I) which has a solvation effect before and after polymerization, monomer B represented by said general formula (II) which can become a graft point or crosslinking component after polymerization, and monomer C having a carboxyl group or a glycidyl group, and a polymer obtained by copolymerizing said polymer further with a monomer which is not soluble in a non-aqueous solvent after polymerization (which is called "monomer D" hereinafter for convenience' sake) are optimum. The present invention has been accomplished on the basis of said finding.

DETAILED EXPLANATION OF THE INVENTION

The resin dispersion according to the present invention can be prepared by polymerizing a system containing at least monomer A, monomer B and monomer C at a temperature of about 60°–120° C. in the presence of a polymerization innitiator which can initiate polymerization at a relatively low temperature such as azobisisobutyronitrile (AIBN), benzoyl peroxide (BPO) or the like in an aliphatic hydrocarbon (for instance, a solvent comprising a petroleum aliphatic hydrocarbon and/or its halide). The polymerization reaction in this instance is a normal one.

For instance, the copolymerization reactions at the time of using lauryl methacrylate as monomer A, using allyl methacrylate as monomer B and using methacrylic acid and glycidyl methacrylate as monomer C are as shown below.

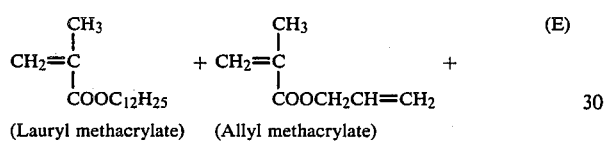

(Lauryl methacrylate)   (Allyl methacrylate)

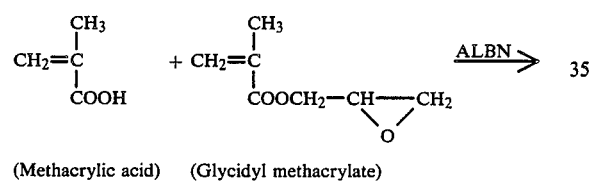

(Methacrylic acid)   (Glycidyl methacrylate)

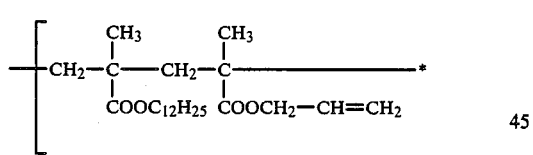

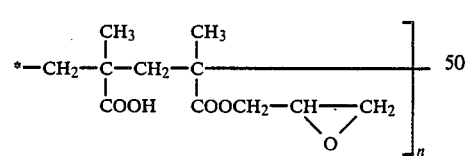

In succession, the reaction at the time of using methyl methacrylate (MMA) as monomer D and polymerizing same in the above mentioned copolymer (E)-containing solvent is as shown below. In this instance, it is ideal to graft-polymerize an allyl group with methyl methacrylate, but it is also applicable to polymerize a homopolymer.

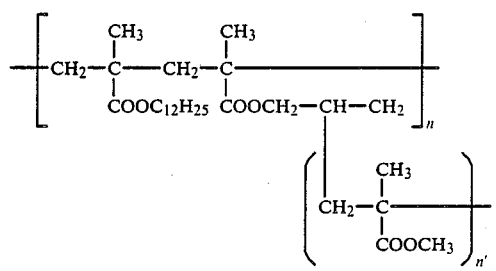

As aforesaid, monomer A represented by the general formula (I) is one which can become a solvation component even after polymerization, and concretely there are enumerated lauryl methacrylate, lauryl acrylate, stearyl methacrylate, stearyl acrylate, 2-ethyl hexyl methacrylate, 2-ethyl hexyl acrylate, dodecyl methacrylate, dodecyl acrylate, hexyl methacrylate, hexyl acrylate, ocryl acrylate, octyl methacrylate, cetyl methacrylate, cetyl acrylate, vinyl laurate, vinyl stearate, nonyl methacrylate, nonyl acrylate, decyl methacrylate, decyl acrylate, cyclohexyl methacrylate, cyclohexyl acrylate and the like.

Monomer B represented by the general formula (II) is one which can become a graft point or cross-linking component after polymerization, and concretely there are enumerated.

 (No. 1)

 (No. 2)

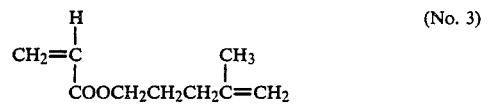 (No. 3)

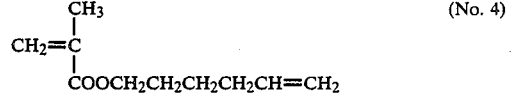 (No. 4)

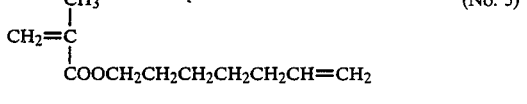 (No. 5)

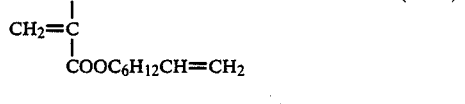 (No. 6)

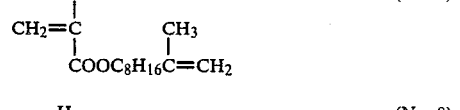 (No. 7)

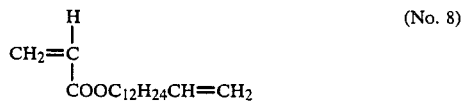 (No. 8)

-continued

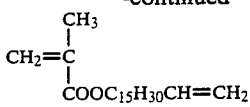 (No. 9)

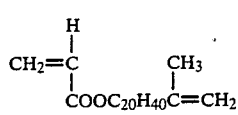 (No. 10)

Monomer C is a polymerizable monomer having a polar group (carboxyl group, glycidyl group), and is a component which donates an electric charge to a polymer and well adsorbs on the surface of a pigment in a non-aqueous solvent, thereby attributing to dispersibility, adhesiveness and fixativity.

As the polymerizable monomer having a carboxyl group there may be enumerated acrylic acid, methacrylic acid, itaconic acid, maleic acid, fumaric acid and the like. As the monomer having a glycidyl group there may be enumerated glycidyl acrylate, glycidyl methacrylate, glycidyl propyl methacrylate, glycidyl propyl acrylate, glycidyl butyl acrylate, glycidyl butyl methacrylate and the like.

Monomer D is a component which forms fine particles in a non-aqueous dispersion and promotes a film formability. As the concrete example of said monomer D there may be enumerated methyl methacrylate, methyl acrylate, ethyl acrylate, ethyl methacrylate, propyl methacrylate, propyl acrylate, n-butyl methacrylate, iso-butyl methacrylate, vinyl acetate, vinyl toluene, styrene, p-chlorostyrene, divinylbenzene, diethyl glycol dimethacrylate, trimethylolpropane trimethacrylate, dimethylamino ethylmethacrylate, acrylonitrile, vinylpyrrolidone, vinylpyridine, dimethylaminomethyl methacrylate and the like.

The suitable weight ratios of monomer A/monomer B/monomer C are 50-95/1-25/1-25. The suitable weight ratios of a copolymer comprising monomer A, monomer B and monomer C/monomer D are about 50-95/5-50.

As occasion demands, the present invention may add a proper amount of another polymerizable monomer to monomer A, monomer B, monomer C or monomer D for copolymerization. In the case of the non-aqueous resin dispersion, furthermore, it is possible, during its manufacturing process, to add fine silica particles and wax or a polyolefin having a softening point of about 60°-130° C.

In the case of using fine silica particles, the resin is considered to be obtained in the state of having incorporated fine silica particles in its crosslinking structure (network structure). In this instance, silica per se naturally has no possibility of undergoing any physical change such as resolution or the like in the course of reaction. At any rate, when silica is used, dispersion stability can be further improved because the specific gravity of silica is closely akin to that of an aliphatic hydrocarbon (dispersion medium) and gelation of the resin can be prevented.

In the case of using wax or polyolefin, which dissolved in a reaction system by heating in the course of polymerization reaction but separates taking the form of fine particles by cooling after the completion of said reaction, the resin is considered to be obtained in the form of having been adsorbed on these fine particles. Wax or polyethylene is not only serviceable for improvement of dispersion stability because it has a specific gravity being closely akin to that of a dispersion medium, prevents gelation of the resin and further has a molecular structure similar to that of said dispersion medium, but also is serviceable for improvement of adhesiveness because it softening point is low. The amount of silica, wax or polyolefin added suitably is about 5-50 parts by weight per 100 parts by weight of resin.

Concrete examples of commercially available wax or polyolefin having a softening point of 60°-130° C. are as shown below Examples of Polyethylene

| Maker | Trade name | Softening point (°C.) |
| --- | --- | --- |
| Union Carbide (U.S.A.) | DYNI | 102 |
| | DYNF | 102 |
| | DYNH | 102 |
| | DYNJ | 102 |
| | DYNK | 102 |
| Monsant (U.S.A.) | ORLIZON 805 | 116 |
| | ORLIZON 705 | 116 |
| | ORLIZON 50 | 126 |
| Philips (U.S.A.) | MARLEX 1005 | 92 |
| Du Pont (U.S.A.) | ALATHON 3 | 103 |
| | ALATHON 10 | 96 |
| | ALATHON 12 | 84 |
| | ALATHON 14 | 80 |
| | ALATHON 16 | 95 |
| | ALATHON 20 | 86 |
| | ALATHON 22 | 84 |
| | ALATHON 25 | 96 |
| Allied Chemical (U.S.A.) | AC-POLYETHYLENE 1702 | 98 |
| | AC-POLYETHYLENE 6 & 6A | 102 |
| | AC-POLYETHYLENE 615 | 105 |
| Sanyo Kasei | Sun Wax 131-P | 108 |
| | Sun Wax 151-P | 107 |
| | Sun Wax 161-P | 111 |
| | Sun Wax 165-P | 107 |
| | Sun Wax 171-P | 105 |
| | Sun Wax E-200 | 95 |

Examples of Wax (Paraffin wax)

| Maker | Trade name | Softening point (°C.) |
| --- | --- | --- |
| Junsei Kagaku | Paraffin Wax | 60–98 |
| Kobayashi Kako | Bees Wax | 65 |
| | Cetanol | 80 |
| Nagai Kako | Bees Wax | 65 |
| Seitetsu Kagaku | Furosen | 110 |

The above mentioned "another polymerizable monomer" includes styrene, vinyl toluene, nitrostyrene, vinyl acetate, vinylpyrrolidone, dimethylaminoethyl methacrylate, dimethylaminoethyl acrylate, diethylaminoethyl methacrylate, diethylaminoethyl acrylate and the like.

The polymerizing catalyst used in the present invention includes phenylazotripenyl methane, laurylperoxide, di-t-butylperoxide, t-butyl peroxide, cumene hydroperoxide and the like in addition to said AIBN and BPO.

The solvent used in the present invention includes petroleum type aliphatic hydrocarbons or halogenated aliphatic hydrocarbons such as kerosene, ligroin, n-hexane, n-heptane, n-octane, i-octane, i-dodecane (commercially available examples of these include "Isopar" H, G, L, K; Naphtha No. 6; "Solvesso" 100 and the like produced by Exxon Corp.), carbon tetrachloride, perfluoroethylene and the like. Aromatic solvents such as toluene, xylene and the like may be added in a small amount to these aliphatic solvents.

In the present invention, polymer particles having a particle diameter of about 0.1–5 μm may be used effectively for paint, printing ink and the like because said particles are superior in separation stability and adhesive strength between molecules.

Preparation of the liquid developer using the thus obtained copolymer may generally be conducted in the manner of mixing 1 part by weight of a colorant with 0.3–3 parts by weight of the copolymer, fully dispersing the resultant mixture in the presence of 10–20 parts by weight of petroleum type aliphatic hydrocarbon or halogenated aliphatic hydrocarbon carrier liquid by means of an attritor, ball mill, KD-mill or the like to produce a concentrated toner, and then diluting same 5–10 times with the solvent of the same kind.

In this case, the copolymer dispersion (resin dispersion) obtained as aforesaid may be used, as it stands, for the copolymer and the solvent. It is also possible to add a polar controller such as the other resin than the copolymer of the present invention, metallic soap, lecithin, linseed oil, higher fatty acid or the like as occasion demands at the time of preparing said concentrated toner, but in the present invention there is no special necessity of adding the polar controller because the resin of the present invention has a strong polarity and is superior in dispersion stability.

As the colorant, there may be used normal inorganic or organic pigments, but colorants prepared by the flushing method are used desirably because pigment particles are dispersed to the extent of primary particles and so the characteristics such as gradient, resolving power, image density and the like are further improved.

The flashing method referred to herein comprises putting a pigment or its hydrated paste together with a resin solution in a kneader called a flusher and mixed to the full (the water present around the pigment is replaced with said resin solution during this process); taking this mixture out of said kneader for removing its water phase; drying the resin solution in which the pigment has dispersed for removing the solvent; and thereafter grinding the resultant mass. This product shall be named a "flushing colorant" in the present invention. In this instance there may be employed a step of removing the water and solvent with stirring under reduced pressure. In view of the fact that a dye, when kneaded with water and used as mud, can achieve the substantially same results as the pigment does in the flushing treatment, the present invention is possible to employ the dye to be subjected to flushing treatment as the toner component. The dye (or pigment)/resin ratio to be used on flushing suitably is 10–60 parts by weight of dye (or pigment) per 100 parts by weight of resin. It is especially profitable that said flushing treatment is conducted in the presence of humic acid, humic acid salts (Na salt, NH4 salt and the like) or the derivative of humic acid. The amounts of humic acids added suitably is about 0.1–30 wt.% of the hydrated dye (or pigment) liquid.

The resins used desirably for flushing include polyolefin, polyolefinvinyl acetate copolymer or its modified resins, polyethylene wax and the like having a softening point of about 50°–140° C. Example of said resins may be enumerated as follows. In this connection, it is needless to say that the aforesaid wax (polyethylene wax) or polyolefin having a softening point of 60°–130° C. may also be used for flushing.

| Maker | Trade name | Softening point (°C.) |
|---|---|---|
| Eastman Chemical | N-10 | 111 |
| | N-11 | 108 |
| | N-12 | 113 |
| | N-14 | 106 |
| | N-34 | 103 |
| | N-45 | 118 |
| | C-10 | 104 |
| | C-13 | 110 |
| | C-15 | 102 |
| | C-16 | 106 |
| | E-10 | 106 |
| | E-11 | 106 |
| | E-12 | 112 |
| | E-14 | 104 |
| | E-15 | 100 |
| Mitsui Sekiyu Kagaku | 110P | 100 |
| | 220P | 113 |
| | 220MP | 113 |
| | 320MP | 114 |
| | 210MP | 120 |
| | 4202E | 108 |
| | 4053E | 111 |
| BASF | OA Wax | 93–96 |
| Petrolite | BARECO 500 | 86 |
| | BARECO 655 | 102 |
| | BARECO 1000 | 113 |
| | E 730 | 93 |
| | E 2018 | 117 |
| | E 2020 | 117 |
| | E 1040 | 105 |
| | PETRONABE C | 90.5 |
| | PETRONABA C-36 | 90.5 |
| | PETRONABA C-400 | 104.5 |
| | PETRONABA C-7500 | 97.8 |
| HEST | PE 520 | 118–123 |
| | PED 121 | 113–118 |
| | PED 136 | 107–112 |
| | PED 153 | 115–120 |
| | PED 521 | 103–108 |
| | PED 522 | 100–105 |
| | PED 534 | 98–105 |

As the aforesaid other resins that can be added to the developer, there may be enumerated natural resins such as acrylic resin, estergum, hardened rosin and the like, these natural resins-modified maleic resin, phenol resin, pentaerythritol resin and the like.

In the case of the liquid developer according to the present invention, it is desirable to incorporate (disperse) solid particles having a particle diameter of 1–20 μm therein for the purpose of improving the image qualities, in particular sharpness and resolving power. As the concrete examples of said solid particles, there may be enumerated resin particles (for instance, homopolymers of methyl methacrylates such as BR 89, BR 85 and Mitsubishi DIANAL), inorganic substances (for instance, glass, silica, titanium oxide), and the like. The suitable amounts of said solid particles having a particle diameter of 1–20 μm added are 0.05–5 parts by weight per 100 parts by weight of the total liquid developer excepting said solid particles.

The thus obtained liquid developer of the present invention was confirmed to exhibit a superior transferability and a superior fixativity on a transfer paper when transferring a toner image obtained by developing an electrostatic latent image onto a transfer paper. This developer was confirmed to possess a high image density and high fixativity and further to be superior in respect of durability and preservability.

The developer like this is also suitably used as that for offset printing, press transferring, magnetic transferring or the like, not to mention the developer for general electrophotography. Next, Examples will be shown. The parts given are by weight.

EXAMPLES

EXAMPLE 1

500 g of kerosene was placed in a 3.0 liter flask equipped with a stirrer, a thermometer, a cooling pipe and a dropping funnel, and was heated at 80° C. A monomer solution comprising 100 g of lauryl acrylate (monomer A), 50 g of said monomer B (No. 1), 10 g of methacrylic acid (monomer C) and 5 g of azobisisobutyronitrile was added dropwise to said flask with stirring for 2 hours. Thereafter, the resultant mixture was subjected to 4 hours' polymerization reaction at the above mentioned temperature, thereby obtaining a resin dispersion having a polymerization ratio of 95%, a viscosity of 180 cp and particle diameter of 0.05-0.15 μm.

EXAMPLE 2

400 g of n-hexane was placed in the flask used in Example 1, and was heated at 90° C. A monomer solution comprising 95 g of 2-ethyl hexyl methacrylate (monomer A), 25 g of monomer B (No. 4), 10 g of glycidyl propyl acrylate (monomer C), 5 g of acrylic acid (monomer C) and 2 g of azobisisobutyronitrile was added dropwise to said flask with stirring for 1 hour. Thereafter, the resultant mixture was subjected to 6 hours' polymerization reaction at the above mentioned temperature, thereby obtaining a resin dispersion having a polymerization ratio of 98.3%, a viscosity of 260 cp and a particle diameter of 0.08-0.24 μm.

EXAMPLE 3

400 g of Isopar G was placed in the same flask as used in Example 1, and was heated at 90° C. A monomer solution comprising 200 g of cyclohexyl acrylate (monomer A), 10 g of monomer B (No. 6), 5 g of methacrylic acid (monomer C), 10 g of glycidyl methacrylate (monomer C) and 3 g of benzoyl peroxide was added to said flask with stirring. The resultant mixture was subjected to 4 hours' polymerization reaction at the above mentioned temperature. Thereafter, 0.1 g of vinyl pyridine was added thereto, and same was subjected to 10 hours' esterification reaction at 80° C., thereby obtaining a resin dispersion having a polymerization ratio of 96.6%, a viscosity of 280 cp and a particle diameter of 0.10-0.32 μm.

EXAMPLE 4

200 g of Isopar H and 50 g of polyethylene (AC Polyethylene 1106 produced by Allied Chemical) was placed in the flask used in Example 1, and was heated at 90° C. to thereby dissolve the polyethylene. A monomer solution comprising 100 g of stearyl methacrylate (monomer A), 200 g of monomer B (No. 9), 1 g of acrylic acid (monomer C), 8 g of diglycidyl acrylate (monomer C) and 10 g of azobisisobutyronitrile was added dropwise to the flask for 2 hours by means of the dropping funnel, and same was subjected to 6 hours' polymerization reaction with stirring at the above mentioned temperature. Then, the resultant mixture was added with 100 g of methyl methacrylate (monomer D) and 5 g of t-butyl peroxide, and same was subjected to further 6 hours' polymerization reaction with stirring at 130° C., thereby obtaining a resin dispersion having a polymerization ratio of 98.0%, a viscosity of 290 cp, and a particle diameter of 0.06-0.23 μm.

EXAMPLES 5-10

Resin dispersions were obtained by using monomer A, monomer B, monomer C and monomer D shown in Table-1 and according the same procedure as Example 1 or 4.

TABLE 1

| Example | Monomer A | Monomer B (Compound No.) | Monomer C | Monomer D | Polymerization ratio (%) | Viscosity (c) | Particle diameter (μm) |
|---|---|---|---|---|---|---|---|
| 5 | Lauryl acrylate 100 g | (No. 2) 8 g | Methacrylic acid 3 g Glycidyl acrylate 3 g | Vinyl acetate 50 g | 96.4 | 102 | 0.05-0.15 |
| 6 | Lauryl methacrylate 100 g | (No. 4) 8 g | Methacrylic acid 3 g Glycidyl acrylate 3 g | Ethyl acrylate 50 g | 95.3 | 260 | 0.02-0.10 |
| 7 | Lauryl methacrylate 100g | (No. 6) 5 g | Mechacrylic acid 3 g Glycidyl acrylate 3 g | Dimethylamino ethylmethacrylate 30 g | 98.3 | 185 | 0.10-0.20 |
| 8 | Stearyl methacrylate 100 g | (No. 8) 10 g | Acrylic acid 5 g | Methyl methacrylate 30 g | 91.4 | 266 | 0.10-0.15 |
| 9 | Stearyl methacrylate 100 g | (No. 1) 10 g | Acrylic acid 5 g | Methyl methacrylate 30 g | 92.5 | 290 | 0.05-0.20 |
| 10 | Stearyl methacrylate 100 g | (No. 3) 10 g | Glycidyl propyl methacrylate 10 g | — | 98.5 | 350 | 0.15-0.45 |

EXAMPLE 11

Carbon Black (#44 produced by Mitsubishi Carbon Co., Ltd.): 10 g
Resin dispersion prepared in Example 1: 50 g
Kerosene: 100 g The above components were dispersed in a ball mill for 20 hours to prepare a concentrated toner having a viscosity of 42.0 cp. 10 g of said toner was dispersed in 1 liter of kerosene to prepare a liquid developer for electrostatic photography.

Then, this developer was put in a commercially available copying machine for electrostatic photography, and copying was effected using zinc oxide sensitive papers to thereby obtain a great number of superior copies having an image density of 1.40, a gradient of 10 and an image fixativity of 86.0%. The image fixativity (%) was calculated from the formula Y/X×100 (wherein, X represents an image density at an early stage of copying, and Y represents an image density after 5-reciprocating erasing motion using an erasing tester).

EXAMPLE 12

Carbon Black (Rarven 14 produced by Columbia Carbon Co., Ltd.): 15 g
Resin dispersion prepared in Example 2: 100 g
Isopar G: 100 g The above components were treated according to the same procedure as Example 11 to prepare a concentrated toner. 100 g of said toner was dispersed in 1 liter of Isopar H to prepare a liquid developer for electrostatic photography. This developer was put in a copying machine for electrostatic photography (Ricopy 5700 produced by Ricoh Co., Ltd.) to obtain a great number of superior copies having an image density of 1.38, an image fixativity of 88.3% and a gradient of 11. Copying was made on a printing master, and this master was subjected to printing to find that 10,000 sheets could be printed stably.

EXAMPLE 13

Flushing colorant comprising 3 parts of phthalocyanine blue and 7 parts of ethylene-vinyl acetate copolymer (Everflex 210): 100 g
Resin dispersion prepared in Example 4: 70 g
Kerosene: 100 g The above components were treated according to the same procedure as Example 11 to prepare a liquid developer for color electrostatic photography. The viscosity of the concentrated toner was 120 cp. Then, this developer was put in a commercially available copying machine for color electrophotography, and color copying was made on a commercially availlble zinc oxide sensitive paper, thereby forming a clear-cut color image. When copying was made using a copying machine for electrophotography (Ricopy DF 1800R produced by Ricoh Co., Ltd.), furthermore, there was obtained a blue copy having a gradient of 12.

EXAMPLE 14

Carbon Black (MA-11 produced by Mitsubishi Carbon Co., Ltd.): 20 g
Resin dispersion prepared in Example 5: 130 g
Isopar H: 100 g The above components were treated according to the same procedure as Example 11 to prepare a liquid developer for electrostatic photography. The viscosity of the concentrated toner was 120 cp. Copying was made according to the same procedure as Example 11, thereby obtaining a copy having an image density of 1.3 g and an image fixativity of 84.1%. This concentrated toner was storaged at room temperature for 3 months, and thereafter was measured in viscosity. Said toner had a viscosity of 124 cp and only had a slight precipitate. When copying was made using this toner, there was obtained a copy having an image density of 1.30 and an image fixativity of 83%.

EXAMPLE 15

Flushing colorant comprising 4.5 parts of Benzidine Yellow and 5.5 parts of Epolene E-15 (polyethlene): 100 g
Resin dispersion prepared in Example 6: 300 g
Isopar H: 300 g The above components were dispersed in a KD-mill for 10 hours to prepare a concentrated toner. 100 g of this toner was dispersed in 1 liter of Isopar H to prepare a color liquid developer for electrophotography. Copying was made using this developer and by means of a copying machine for electrophotography (Ricopy DT 1800R produced by Ricoh Co., Ltd.) to obtain a great number of superior copies having a gradient of 12, and image fixativity of 88.0% and a resolving power of 10 lines/mm.

EXAMPLE 16

Flushing colorant comprising 4 parts of Carbon Black (#44 produced by Mitsubishi Co., Ltd.), 6 parts of polyethylene (Sunwax 171-P) and 0.5 parts of humic acid: 100 g
Resin dispersion prepared in Example 7: 100 g
Isopar G: 300 g The above components were dispersed in an attritor for 4 hours to prepare a concentrated toner. 1.0 g of DIANAL BR-85 (having an average particle diameter of 13 μm) was added thereto and stirred. 100 g of this dispersion was dispersed in 1 liter of Isopar G to prepare a liquid developer for electrophotography.

Copying was made using this liquid developer and by means of an electrostatic copying machine (Ricopy DT5700 produced by Ricoh Co., Ltd.), obtaining a high quality image having an image density of 1.44, and image fixativity of 86.4%, a gradient of 10 and a superior sharpness.

As is evident from the above Examples, the resin dispersion according to the present invention is superior in dispersibility and adhesiveness, and is effectively utilized especially for the liquid developer.

What is claimed is:

1. A liquid developer for electrophotography characterized by containing a colorant and a non-aqueous type resin dispersion obtained by polymerizing a system containing at least monomer A which has the formula (I),

wherein $R^1$ is —H or —CH$_3$, X is —COOC$_n$H$_{2n+1}$ or —OCOC$_n$H$_{2n+1}$, and n is an integer of 6–20; monomer B which has the formula (II),

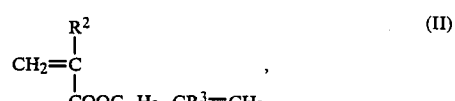

wherein $R^2$ and $R^3$ are —H or —CH$_3$ and m is an integer of 1–20, and monomer C which has a carboxyl group or a glycidyl group, in the presence of a polymerization initiator in an aliphatic hydrocarbon solvent, wherein the weight ratio of monomer A:monomer B:monomer C is 50–95:1–25:1–25.

2. The liquid developer as claimed in claim 1, wherein said non-aqueous type resin dispersion further contains a polymerizable monomer D.

3. The liquid developer as claimed in claim 2, wherein the weight ratio of the copolymer comprising monomer A, monomer B and monomer C to the monomer D is 50–95:5–50.

4. The liquid developer as claimed in claim 2, wherein said monomer D is selected from the group consisting of methyl methacrylate, methyl acrylate, ethyl acrylate, ethyl methacrylate, propyl methacrylate, propyl acrylate, n-butyl methacrylate, iso-butyl methacrylate, vinyl acetate, vinyl toluene, styrene, p-chlorostyrene, divinylbenzene, diethylene glycol dimethacrylate, trimethylolpropane trimethacrylate, dimethylamino ethylmethacrylate, acrylonitrile, vinylpyrrolidone, vinylpyridine and dimethylaminomethyl methacrylate.

5. The liquid developer as claimed in claim 1, wherein said non-aqueous type resin dispersion further contains at least one member selected from the group consisting of powdery silica, wax and polyolefin.

6. The liquid developer as claimed in claim 3, wherein said non-aqueous type resin dispersion further contains at least one member selected from the group consisting of powdery silica, wax and polyolefin.

7. The liquid developer as claimed in claim 1, wherein said monomer A is stearyl methacrylate, said monomer B is

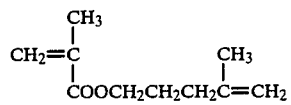

and said monomer C is glycidyl propyl methacrylate.

8. The liquid developer as claimed in claim 2, wherein said monomer A is lauryl acrylate, said monomer B is

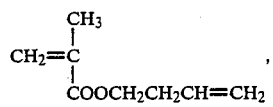

said monomer C is methacrylic acid and glycidyl acrylate and said monomer D is vinyl acetate.

9. The liquid developer as claimed in claim 2, wherein said monomer A is lauryl methacrylate, said monomer B is

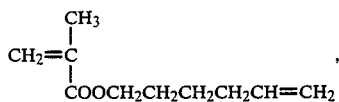

said monomer C is methacrylic acid and glycidyl acrylate and said monomer D is ethyl acrylate.

10. The liquid developer as claimed in claim 9, wherein said monomer B is

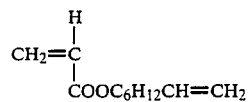

and said monomer D is dimethylamino ethylmethacrylate.

11. The liquid developer as claimed in claim 2, wherein said monomer A is stearyl methacrylate, said monomer B is

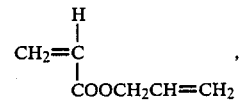

said monomer C is acrylic acid and said monomer D is methyl methacrylate.

12. The liquid developer as claimed in claim 9, wherein said monomer B is

13. A non-aqueous resin dispersion obtained by copolymerizing (1) a monomer A having the formula (I)

wherein $R^1$ is —H or —$CH_3$, X IS —$COOC_nH_{n+1}$ or —$OCOC_nH_{2n+1}$, and n is an integer of 6 to 20, (2) a monomer B having the formula (II)

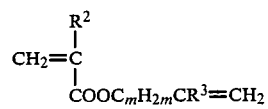

wherein $R^2$ and $R^3$ are —H or —$CH_3$, and m is an integer of 1 to 20, and (3) a monomer C which has a carboxyl group or a glycidyl group, in the presence of a polymerization initiator, in an aliphatic hydrocarbon solvent, to obtain a copolymer; and then grafting said copolymer with a monomer D selected from the group consisting of methyl methacrylate, methyl acrylate, ethyl acrylate, ethyl methacrylate, propyl methacrylate, propyl acrylate, n-butyl methacrylate, iso-butyl methacrylate, vinyl acetate, vinyl toluene, styrene, p-chlorostyrene, divinylbenzene, diethyleneglycol dimethacrylate, trimethylolpropane trimethacrylate, dimethylaminoethyl methacrylate, acrylonitrile, vinylpyrrolidone, vinylpyridine and dimethylaminomethyl methacrylate, the weight ratio of monomer A/monomer B/monomer C being 50–95/1–25/1≧25 and the weight ratio of said copolymer/monomer D being 50–95/5–50.

14. The liquid developer as claimed in claim 1 in which said monomer B is selected from the group consisting of

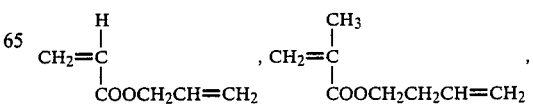

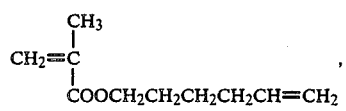
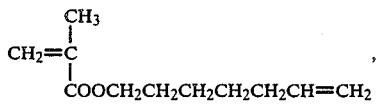
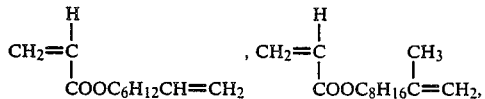
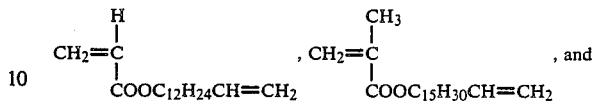
* * * * *

UNITED STATES PATENT AND TRADEMARK OFFICE
CERTIFICATE OF CORRECTION

PATENT NO. : 4 764 447
DATED      : August 16, 1988
INVENTOR(S): Kazuo TSUBUKO et al It is certified that error appears in the above-identified patent and that said Letters Patent is hereby corrected as shown below:

Column 13, line 26; change "claim 3" to ---claim 2---.
Column 14, line 15; change "claim 9" to ---claim 11---.
           line 57; change "1$\geq$25" to ---1-25---.

Signed and Sealed this

Sixth Day of June, 1989

Attest:

DONALD J. QUIGG

*Attesting Officer*    *Commissioner of Patents and Trademarks*